United States Patent [19]

de Concini et al.

[11] Patent Number: 4,860,593

[45] Date of Patent: Aug. 29, 1989

[54] ULTRASONIC DEVICE FOR MEASURING THE RATE OF FLOW OF FLUID IN A DUCT

[75] Inventors: Roberto de Concini, Zola Predosa; Massimo Brighi, Bologna, both of Italy

[73] Assignee: Weber s.r.l., Turin, Italy

[21] Appl. No.: 139,184

[22] Filed: Dec. 29, 1987

[30] Foreign Application Priority Data

Dec. 30, 1986 [IT] Italy ................ 67982 A/86

[51] Int. Cl.[4] .............................................. G01F 1/66
[52] U.S. Cl. ................................................ 73/861.29
[58] Field of Search ........... 73/861.25, 861.26, 861.27, 73/861.28, 861.29, 861.31, 861.02, 861.18

[56] References Cited

U.S. PATENT DOCUMENTS

| 2,746,291 | 5/1956 | Swengel | 73/861.31 |
| 2,826,912 | 3/1958 | Kritz | 73/861.27 |
| 3,548,653 | 12/1970 | Corey | 73/861.27 |
| 3,555,899 | 1/1971 | Yamamoto et al. | 73/861.27 |
| 3,727,458 | 4/1973 | Parkinson | 73/861.27 |
| 4,408,589 | 10/1983 | Hauler et al. | 73/861.31 |
| 4,527,432 | 7/1985 | Gutterman | 73/861.28 |

Primary Examiner—Stewart J. Levy
Assistant Examiner—Robert P. Bell
Attorney, Agent, or Firm—Gifford, Groh, Sheridan, Sprinkle and Dolgorukov

[57] ABSTRACT

An ultrasonic device for measuring the rate of flow of fluid in a duct employs an ultrasonic signal transmitter and two ultrasonic signal receivers operating simultaneously, and the respective energy paths joining the receivers with the transmitter form predetermined angles of inclination with respect to the axis of the duct. Phase differences between the signals received by the receivers, and the pressure of the fluid in the duct, are used to form an output signal indicative of the mass flow rate of fluid in the duct.

11 Claims, 2 Drawing Sheets

ULTRASONIC DEVICE FOR MEASURING THE RATE OF FLOW OF FLUID IN A DUCT

BACKGROUND OF THE INVENTION

The present invention relates to an ultrasonic device for measuring the rate of flow of fluid in a duct, particularly for measuring the mass flow rate of air passing along the inlet duct of a heat engine.

As is known, especially in the said application, and when the engine is fed by an electronic fuel injection system, it is particularly important to measure even very short term variations in the flow rate in a sufficiently precise and rapid manner for the purpose of correctly performing the various engine control strategies.

To overcome the disadvantages of slowness in response and of major breakdowns of moving parts, to which measurement devices of mechanical type are subject, ultrasonic measurement devices have been proposed, which are based on the principle of detecting the off-set in the phase difference presented by two ultrasonic frequency signals which are exchanged between respective electroacoustic transducers functioning alternately as transmitter element and receiver element and which are disposed in diametrically opposite positions in the duct itself. The circuit which drives the transducers and processes the signals supplied thereby is necessarily very complex and therefore as well as being relatively expensive can to some extent be subject to breakdowns.

SUMMARY OF THE INVENTION

The object of the present invention is that of providing an ultrasonic device for measuring the rate of flow of fluid in a duct, particularly for the said application, which will be of very simple construction and therefore of low cost, and which will have a very reliable operation.

According to the present invention there is provided an ultrasonic device for measuring the rate of flow of fluid in a duct, characterised by the fact that it comprises, disposed in opposite positions in the said duct:
an ultrasonic signal transmitter and two signal receivers simultaneously, and in which the signal paths between these receivers with the transmitter form respective predetermined angles of inclination with respect to the axis of the said duct; and including electronic means which receive the signals provided by the said receivers and produce therefrom a first signal dependent on the phase difference between the signals received by the said receivers, the said electronic means processing the said first signal together with a second received signal proportional to the pressure of the fluid in the said duct to provide an output signal indicative of the mass flow rate in the duct.

BRIEF DESCRIPTION OF THE DRAWINGS

For a better understanding of the present invention various embodiments thereof are now described purely by way of nonlimitative example with reference to the attached drawings, in which.

DETAILED DESCRIPTION OF THE INVENTION

Figure 1:
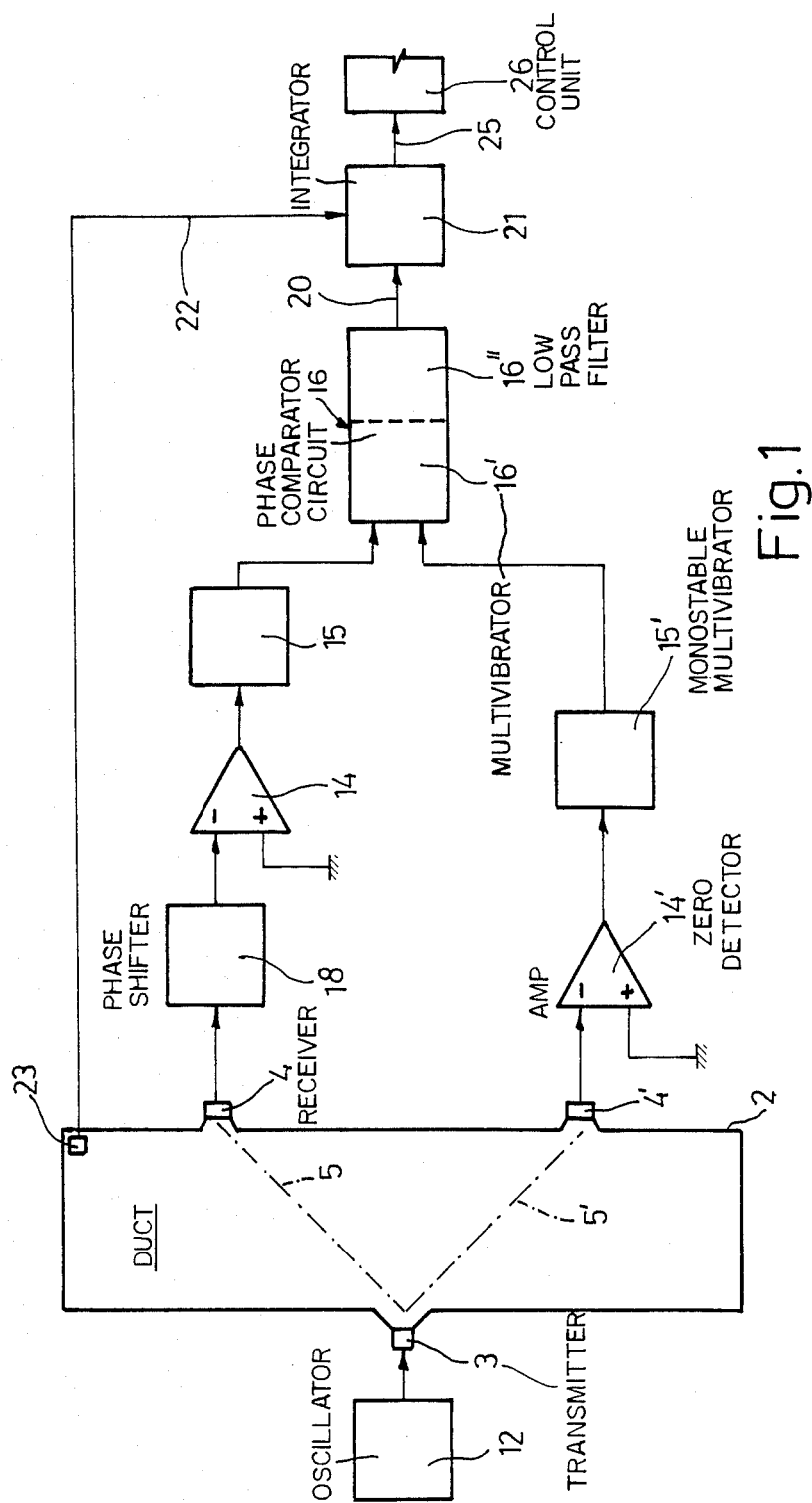
FIG. 1 is a block schematic diagram of the device formed according to the principles of the present invention.

With reference to FIG. 1, this illustrates a longitudinal section of a portion 2 of the duct through which the fluid passes, for example air, the flow rate of which is to be measured; this portion 2 can be a portion of the air induction manifold for supply of an internal combustion engine, for example one provided with electronic fuel injection.

Figure 2:
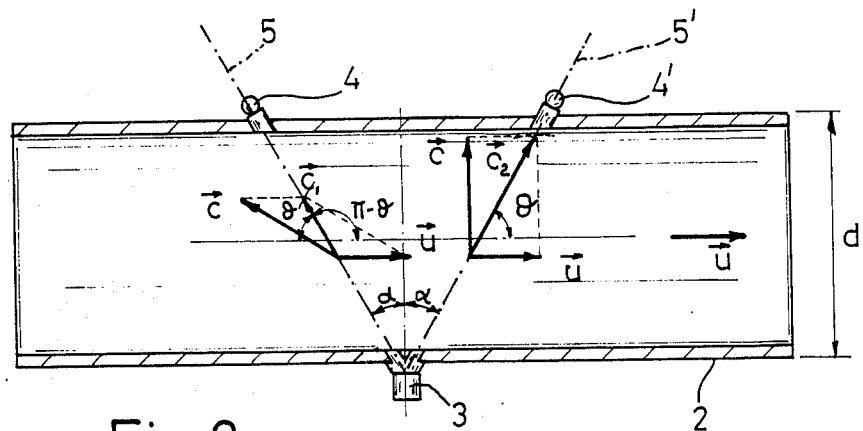
FIG. 2 is a schematic sectional side view of a portion of a duct fitted with the electro-acoustic transducers of the device of the present invention.

On one side of the portion 2 of the duct, for example having a circular section of diameter d, as is better illustrated in FIG. 2, there is disposed an ultrasonic signal transmitter 3 and in a diametrically opposite region of this portion 2 there are disposed two ultrasonic signal receivers 4 and 4'. Each of the two receivers 4 and 4' is disposed in the direction of a straight line respectively 5 and 5' which starts from the centre of the transmitter 3 and forms a predetermined angle $\theta$ and $\pi - \theta$ with respect to the axis of the portion 2 of the duct. These two straight lines 5 and 5' further form a respective angle $\theta$ with the perpendicular to the axis of the portion 2 of the duct, which originates from the transmitter 3, and represent the signal paths between the receivers and the transmitter.

Figure 3:
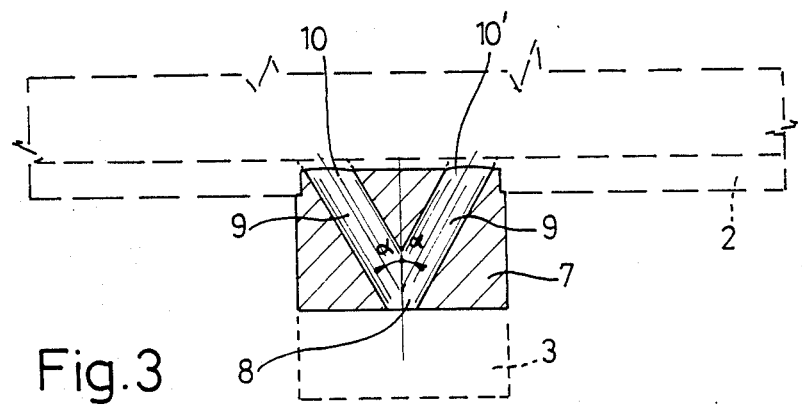
FIG. 3 is a sectioned side view of an element which can be fitted in the device of the present invention.

At the output of the transmitter 3, as is seen in FIG. 3, there can be fitted a wave guide 7 which serves to convey the ultrasonic signals which it receives from the transmitter 3 from an input mouth 8 along two internal channels 9 which are orientated along the directions of the straight lines 5 and 5' and which have respective output openings 10 and 10' in the duct section 2. Guide 7 thus directs the signals along the paths 5 and 5'.

The transmitter 3 and the two receivers 4 and 4' are conveniently constituted by electro-acoustic transducers made with ceramic crystals which produce a voltage by the piezo-electric effect if stimulated by a variable pressure and vice versa.

As is visible in FIG. 1, the transmitter 3 is supplied by an oscillator unit 12 which provides, for example, a square wave having a working frequency of several tens of KHz.

The electric output signal from the receiver 4' arrives at the inverting amplifier and zero detector unit 14' which supplies an output signal when the input signal is substantially negative. The output signal of the unit 14' is therefore constituted by a rectangular wave with a duty cycle equal to about 0.5 so as to have a signal adapted for guiding a successive phase comparator unit 16. This output signal from the unit 14' is sent to a monostable multivibrator unit 15' which provides a short output pulse in substantial correspondence with the rising edge of the input wave. The output of the unit 15' is supplied to an input of the unit 16 to the other input of which is supplied the output of a similar chain constituted by units 14 and 15 similar to the units 14' and 15' described above. The inverting input of the unit 14 is in turn connected to the output of a phase shifter circuit 18 which receives the output signal from the receiver 4; this phase shifter circuit 18 serves to correct the different phase displacements between the signals from the receivers 4 and 4' which are due to the air path in the portion 2 of the duct and to the electric processing circuit, and is adjusted once and for all during calibration so as to give a nil phase shift between the signals from the receivers 4 and 4' when the air flow is nil.

The phase comparator block 16 comprises a bistable multivibrator 16 of the SET - RESET type, formed with NOR logic gates so that the output signal, for example, goes to the high level when a signal arrives from the unit 15, and goes to the low level when a signal arrives from the unit 15'. The output of the bistable multivibrator is then supplied to a low pass filter 16" which forms an output signal 20 equal to the mid value of the input signals, and is in this way indicative of the degree of angular phase shift between the two signals provided by the receivers 4 and 4'.

This signal 20 is then supplied to a unit 21 which receives another signal 22 from a pressure transducer 23 disposed in the portion 2 of the duct, and which operates in a manner which will be described hereinbelow to form an output signal 25 indicative of the rate of flow of fluid in the portion 2 of the duct. This signal 25 can therefore be utilised in a more convenient manner and can for example be provided to a central command and control unit 26 of an electronic injection system for an internal combustion engine.

Before passing on to the description of the operation of the measuring device of the present invention there is here provided a brief theoretical treatment of the laws which correlate the difference between the phase of the ultrasonic waves received by the receivers 4 and 4' and the rate of flow of fluid in the portion 2 of the duct. Further, the generally well verified hypothesis is introduced that the velocity U of the fluid is constant in magnitude and direction in all the points at least of the laminer section along the axis of the portion 2 including the straight lines 5 and 5'.

With reference to FIG. 2, the ultrasonic waves which arrive from the transmitter 3 at the receiver 4' have a velocity $C_2$ which is given by the vector sum of the velocity of the sound c and the velocity u of the fluid in the portion 2 of the duct. Therefore, one has:

$$\vec{C_2} = \vec{c} + \vec{u}, \text{ from which } \vec{c} = \vec{C_2} - \vec{u} \text{ and therefore:}$$

$c^2 = C_2^2 + u^2 - 2 C_2 u \cos\theta$. Resolving this one has:

$$C_2 = u \cos\theta \pm \sqrt{u^2\cos^2\theta - u^2 + c^2}$$

since $c > u$ $e(\cos^2\theta - 1) = -\sin^2\theta$ with the result that:

$$c_2 = u \cos\theta + \sqrt{c^2 - u^2 \sin^2\theta}$$

Now, considering the ultrasonic waves which propagate from the transmitter 3 towards the receiver 4, with an analogous treatment it results that:

$c_1 = -u \cos\theta + c^2 - u^2 \sin^2\theta$

If now we consider the phases $\phi_1$ and $\phi_2$ of the waves which propagate respectively from the transmitter 3 to the receiver 4 and from the transmitter 3 to the receiver 4'.

The phase $\phi$ of the wave which arrives at a receiver at any instant is equal to the phase $\phi_0$ at the transmitter plus $2\pi$ times the number of waves contained in the space between the source and the receiver. Therefore, if the distance between the transmitter 3 and the receiver 4 or 4' is written $1 = d/\cos\alpha$ one can write:

$$\phi_1 = \phi_0 + 2\pi \frac{1}{\lambda_1} : \phi_2 = \phi_0 + 2\pi \frac{1}{\lambda_2}$$

from the relation $\lambda\gamma = c$ (where $\gamma$ is the frequency of the ultrasonic wave) one has $$\phi_1 - \phi_0 + 2\pi \frac{\nu 1}{c_1} : \phi_2 - \phi_0 + \frac{2\pi\nu 1}{c_2}$$

The phase difference between the waves which arrive at the receivers 4 and 4' is:

$$\delta\phi = \phi_1 - \phi_2 = 2\pi\nu 1 \frac{(1-1)}{c_1 c_2} = 2\pi\nu 1 \frac{(c_2 - c_1)}{c_1 c_2}$$

By substituting the first indicated values for $c_1$ and $c_2$ one has:

$$\delta\phi = 2\pi\nu 1 \frac{(2u\cos\theta)}{c^2 - u^2} = 4\pi\nu 1 \cos\theta \cdot u \cdot \frac{(1)}{c^2 \left(1 - \frac{u^2}{c^2}\right)}$$

Supposing it were possible to neglect $u^2/c^2$ with respect to unity in that even at the maximum rate of flow of fluid envisaged, c would always be very much greater than u, then one could express the following linear relation between u and $\delta\phi$.

$$\delta\phi = K u, \text{ where } K = \frac{4\pi\nu 1 \cos\theta}{c^2} = \frac{4\pi\nu d \tan\alpha}{c^2}$$

The mass flow rate G is connected to the velocity of the fluid in the duct by means of the relation:

$G = \rho A u$ where $\rho$ is the density of the fluid and A is the cross section of the duct, and for FIG. 2, $A = \pi/4 \, d^2$.

Proceeding to substitution, and bearing in mind the preceding linear relation, one has:

$$G = \rho \frac{\pi}{4} d^2 \frac{\delta\phi}{K}, \text{ from which: } G = \rho c^2 \frac{d}{16\nu \tan\alpha} d\phi$$

The product $\rho c^2$ has a value determined by the thermo dynamic state of the fluid. In particular, for a gas: $\rho c^2 = \gamma p$, where p is the pressure of the fluid and $\gamma = c_p/c_v$, which latter is the ratio between the specific heats at constant volume and constant pressure, so that one has:

$$G = \frac{\gamma d}{16\nu \tan\alpha} p\delta\phi = K_0 \, p\delta\phi$$

Therefore, with reference to FIG. 1, the block 21 receives the signals 20 and 22 which represent, respectively, the values $\delta\phi$ and p, and also form the product with the value $K_0$ which is established on the basis of the parameters of the device and of the portion 2 of the duct so that the signal 25 which represents the value G of mass flow rate is produced directly.

Figure 4:
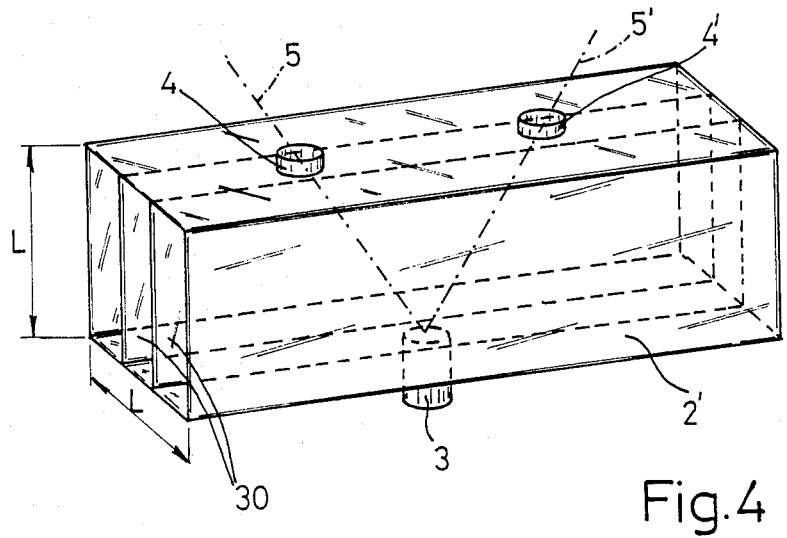
FIG. 4 is a perspective view of a different embodiment of a section of the duct with electro-acoustic transducers of the device of the present invention.

In a variant embodiment illustrated in FIG. 4 the portion of the duct, indicated 2' is of square cross section of side L and has within its interior, parallel to the axis of the portion 2' itself, two longitudinal partitions 30 of height L which are disposed facing one another and spaced on opposite sides of the central zone where the transmitter 3 and the two receivers 4 and 4' are disposed so as to define a space within which the ultrasonic waves which travel from the transmitter 3 to the receivers 4 and 4' are conveyed, in which the fluid certainly has a laminar flow. These two partitions 30 can conveniently be clad in sound absorbing material. In the case of this duct 2' the value of the constant $K_0$ for the multiplication block 21 is obviously varied.

The advantages obtained with the device of the present invention are evident from what has been described; in particular a particularly simple and efficient circuit configuration is obtained, which allows even very rapid variations in the mass flow rate of fluid to be detected with high precision of the order of several per cent.

Finally, it is clear that the embodiments of the present invention described and illustrated can have modifications and variations introduced thereto which do not depart from the inventive scope of the idea contained in it. For example, the form of the duct portion can be varied and the circuit configuration illustrated in FIG. 1 can be obtained differently, and the operation of the oscillator block 12 can be intermittent rather than continuous.

I claim:

1. An ultrasonic device for measuring the rate of flow of fluid in a duct (2.2') characterized by the fact that it comprises, disposed in diametrically opposite positions in the said duct:

an ultrasonic signal transmitter (3) and respectively two ultrasonic signal receivers (4.4') operating simultaneously and in which the signal paths (5.5') extending respectively between the receivers (4.4') and the transmitter (3) form respective predetermined angles of inclination ($\theta$, $-\theta$) with respect to the axis of the said duct (2.2'); and including electronic means (15, 21) which receive signals provided by the said receivers (4,4'), and produce therefrom a first signal (20) dependent on the phase difference between the signals received by the said receivers (4, 4'), the said electronic means processing the said first signal (20) together with a second received signal (22) proportional to the pressure of the fluid in the said duct (2, 2') to provide an output signal (25) indicative of the mass flow rate of fluid in the duct (2, 2'), said duct including a pair of axially extending facing walls (30) disposed in the said duct (2') delimiting the section of the duct in which the said signal paths (5, 5') extending between the said receivers (4, 4') and the transmitter (3) are contained.

2. A device according to claim 1, characterized by the fact that it includes a wave guide unit (7) fitted to the said duct (2, 2') and operable to receive the said ultrasonic signals emitted by the said transmitter (3) and to convey them by means of internal channels (9) in the direction of the said signal paths (5, 5') towards the said receivers (4, 4').

3. A device according to claim 1, characterised by the fact that the said duct (2) has a circular cross section.

4. A device according to claim 1, characterized by the fact that the said duct (2') has rectangular cross section.

5. A device according to claim 1, characterised by the fact that the said electronic means include a phase comparator circuit (16) which receives electrical signals coming from the said two receivers (4, 4') and produces the said first signal (20).

6. A device according to claim 4, characterized by the fact that the said phase comparator circuit (16) includes a bistable multivibrator (16') followed by a low pass filter (16'')

7. A device according to claim 5, characterized by the fact that the said electronic means includes respective circuit units (14, 14') which receive the electrical signals from the said two receivers (4, 4') and provide the said phase comparator circuit (16) with respective signals indicating whether or not a certain threshold value is exceeded.

8. A device according to claim 7, characterized by the fact that the said circuit units (14, 14') include zero flow detectors and are followed by respective monostable multivibrators (15, 15').

9. A device according to claim 5 characterised by the fact that it includes a phase shifting circuit (18) connected between one of the said two receivers (4, 4') and the said phase comparator circuit (16).

10. A device according to claim 1, characterised by the fact that the said duct (2, 2') is constituted by a portion of the air inlet duct of a heat engine.

11. An ultrasonic device for measuring the rate of flow of fluid in a duct (2, 2') characterized by the fact that it comprises, disposed in diametrically opposite positions in the said duct:

an ultrasonic signal transmitter (3) and respectively two ultrasonic signal receivers (4, 4'') operating simultaneously and in which the signal paths (5, 5') extending respectively between the receivers (4, 4') and the transmitter (3) form respective predetermined angles of inclination ($\theta$, $-\theta$) with respect to the axis of the said duct (2, 2'); and including electronic means (15, 21) which receive signals provided by the said receivers (4, 4') and produce therefrom a first signal (20) dependent on the phase difference between the signals received by the said receivers (4, 4'), the said electronic means processing the said first signal (20) together with a second received signal (22) proportional to the pressure of the fluid in the said duct (2, 2') to provide an output signal (25) indicative of the mass flow rate of fluid in the duct (2, 2'), said electronic means including a phase comparator circuit (16) which receives electrical signals coming from the said two receivers (4, 4') and produces the said first signal (20), and a phase shifting circuit (18) connected between one of the said two receivers (4, 4') and the said phase comparator circuit (16).

* * * * *